United States Patent
Salomäki

(10) Patent No.: US 6,222,924 B1
(45) Date of Patent: Apr. 24, 2001

(54) SCRAMBLING OF DIGITAL MEDIA OBJECTS IN CONNECTION WITH TRANSMISSION AND STORAGE

(75) Inventor: Ari Salomäki, Järvenpää (FI)

(73) Assignee: Oy Nokia AB, Espoo (FI)

(*) Notice: Subject to any disclaimer, the term of this patent is extended or adjusted under 35 U.S.C. 154(b) by 0 days.

(21) Appl. No.: 09/117,221
(22) PCT Filed: Jan. 29, 1997
(86) PCT No.: PCT/FI97/00045
§ 371 Date: Aug. 18, 1998
§ 102(e) Date: Aug. 18, 1998
(87) PCT Pub. No.: WO97/28649
PCT Pub. Date: Aug. 7, 1997

(30) Foreign Application Priority Data

Jan. 30, 1996 (FI) .......................................... 960418

(51) Int. Cl.[7] .................................................. H04K 1/00
(52) U.S. Cl. ........................... 380/200; 713/178; 713/182; 713/185; 380/210; 380/233; 380/231; 380/236; 380/237
(58) Field of Search ..................................... 713/178, 182, 713/185; 380/210, 236, 233, 231, 237, 53

(56) References Cited

U.S. PATENT DOCUMENTS

| | | | |
|---|---|---|---|
| 5,150,407 | * | 9/1992 | Chan ........................................... 380/4 |
| 5,475,757 | | 12/1995 | Kelly ........................................ 380/24 |
| 5,751,806 | * | 5/1998 | Ryan .......................................... 380/9 |
| 5,923,763 | * | 7/1999 | Walker et al. .......................... 380/51 |

FOREIGN PATENT DOCUMENTS

| | | |
|---|---|---|
| 0666694 A1 | 8/1995 | (EP) . |
| 0674440 A2 | 9/1995 | (EP) . |
| 0710025 A1 | 5/1996 | (EP) . |
| WO 91/13517 | 9/1991 | (WO) . |
| WO 95/03655 | 2/1995 | (WO) . |

OTHER PUBLICATIONS

Front page of Finnish Patent No. FI 100563 B (Finnish application No. 960418).
PCT International Search Report.

* cited by examiner

*Primary Examiner*—Thomas R. Peeso
*Assistant Examiner*—Todd Jack
(74) *Attorney, Agent, or Firm*—Perman & Green, LLP

(57) ABSTRACT

To prevent unauthorized reception, storage, copying and reproduction of digital media objects it is defined in addition to a scrambled broadcast format a scrambled storage format which is different from the broadcast format. A user's terminal equipment cannot receive, store or reproduce protected objects without a key which is advantageously a bit sequence stored on a portable memory medium and which can be different according to the type of use it gives entitlement to. To prevent the storing and later reproduction as such of data in the broadcast format, a time stamp is included in the broadcast format representing the time of broadcasting. A playback device cannot reproduce a broadcast-format object if the reproduction time differs from the time stamp included in the broadcast format. The reproduction time is advantageously read from a real time clock of a portable memory medium.

20 Claims, 4 Drawing Sheets

SCRAMBLING OF DIGITAL MEDIA OBJECTS IN CONNECTION WITH TRANSMISSION AND STORAGE

BACKGROUND OF THE INVENTION

1. Field of the Invention

The invention relates in general to the protection of digital sound and picture objects against unauthorized reception and copying and in particular to how the protection against unauthorized reception and copying can be implemented in a uniform manner as regards broadcasting, local storage and the selling and distribution of recordings to consumers.

2. Description of the Related Art

Electrical transmission and storage of programs and presentations including images and/or sound has shifted or is shifting from analog to digital technology, the advantages of the latter being lower susceptibility to spurious effects and versatile error correction possibilities. The quality of a digital image and sound will not deteriorate in transmission, reception and storage in the same way as it does when using analog technology. Digital technology is already being widely used in the sales and distribution of audio and data recordings in the form of compact discs, or CDs. Computers apply digital magnetic storing of data in their mass memory units and digital broadcasting systems are in pilot stages. We can assume that in the future both the capacity and the exploitation of data transmission and storage will continue to increase.

Below, all digital sound and image recordings and transmissions handled as one entity will be called simply objects. An object may be a picture, sound effect, piece of music, film, animated program, radio program, multimedia program or other corresponding entity which can be transmitted, stored and reproduced to a user as such and/or together with other corresponding objects. By transmission it is meant especially broadcasting, where a transmitting station electrically distributes objects to a great number of receivers on a regular basis. By storing it is meant that the object or a period extracted from it is rendered into a form from which it can be later decoded to be reproduced to a user several times if required.

Computer programs can also be considered some kind of objects, even though they are not in the same way meant to be broadcast. Multimedia and interactive mass media becoming more popular, the boundary between the computer program as we know it and the radio or TV program, whether it is meant to be entertaining or educational, will become blurred. For instance, the digital audio broadcasting (DAB) system provides for transmitting objects that are broadcast in file format and loaded in the storage media of the receiving equipment to be later interactively reproduced to a user so that the user will have the opportunity to change the flow of the program.

Since digital recordings are easily duplicated, there has arisen a need to encrypt, or scramble, the objects in connection with transmission and storage so that their reception and reproduction without a permission from their copyright owners be as difficult as possible. The purpose of this arrangement is that the producer and/or distributor of an object get a certain remuneration from the receiver and/or user. It is common that a user acquires a decoding device or key with which the object can be descrambled for use. A so-called black box is known from the prior art which descrambles programs sent on TV channels liable to charges. A descrambling device may be controlled by a so-called smart card, for example, which contains the code words needed for descrambling. A similar method, where a scrambled transmission is descrambled using keys stored in a smart card, has been applied in digital data transmission in the GSM mobile telephone system, for example.

Scrambling and descrambling methods and devices according to the prior art are usually characterized in that they are channel specific which means the scrambling is directed to a particular transmission stream always in the same way regardless of what objects the transmission stream contains. The only options are switching the scrambling on and off, if e.g. a pay TV channel wants to send a particular film or program unscrambled so that it can be viewed by a larger audience. Copyrights, however, are always directed to individual objects and, therefore, methods according to the prior art cannot implement a pay system where the producers of objects acquired from different sources could be remunerated in any other way than if the transmitting station pays for the right to broadcast a particular object in its distribution network or coverage area.

Arrangements according to the prior art are also characterized in that a receiver who has at his disposal a descrambling device can without limitation store, duplicate and further distribute a particular object after having descrambled it. To safeguard the rights of parties producing objects and their transmission and distribution services it is essential that users could be obliged to pay a separate recompense for storing and duplicating an object.

In conjunction with computer software it is used a fixed key device, or a so-called hardlock, which usually comprises an electric circuit cast in a plastic housing that has to be inserted in the communications port of the computer for the program to be usable. With this arrangement it is to some extent possible to prevent the duplication of an object because an ordinary user cannot duplicate the hardlock and a duplicated program copy will not function without the hardlock. However, the arrangement is rather inflexible as the hardlock is tied to a particular version of a particular object, and it cannot be applied on a broader basis if the objects vary and change constantly as they do in a broadcast-type transmission.

BRIEF SUMMARY OF THE INVENTION

An object of this invention is to provide a method for scrambling and descrambling electrically transmitted objects, covering the transmission, reception, storing and reproduction of objects. Another object of the invention is to provide a method which attaches to said scrambling a payment system whereby recompenses corresponding to the descrambling rights are directed to parties producing objects and transmission and distribution services for the objects. A further object of the invention is that the method according to it be applicable to known digital transmission and storing arrangements.

The objects of the invention are achieved by defining general, standardized scrambling data formats to be applied in the broadcasting and storage of digital data, using different scrambling data formats for storing and broadcasting. The achievement of the objects of the invention can be further advanced by adding to the user's descrambling device a real time clock, combining a real time code to the digital broadcast format and by combining the payment transactions corresponding to the descrambling rights to the distribution of descrambling keys.

The method according to the invention for protecting digital media objects against unauthorized use, which objects can be electrically distributed to several receivers and stored on a memory medium for later use, wherein a scrambled broadcast format is specified for said media objects, is characterized in that a scrambled storage format is also specified for said media objects for the storing on said memory medium, which scrambled storage format is different from said scrambled broadcast format.

The invention is also directed to terminal equipment for receiving, storing and reproducing digital media objects to a user, said terminal equipment comprising means for descrambling the scrambled broadcast format. The terminal equipment according to the invention is characterized in that it further includes means for storing a received media object in a scrambled storage format which is different from said scrambled broadcast format.

The invention implies that a common international agreement or standard can define different scrambled formats or identification procedures for digital media objects according to whether they are being transmitted or stored. In addition, different formats or identification procedures can be specified for an object according to whether it is the original version (produced by the copyright owner) or a copy produced by someone else. Devices handling digital media objects are manufactured such that they can reproduce a received or stored object only if they have at their disposal the key that authorizes the reproduction of the object in question. Furthermore, in an advantageous embodiment of the invention, the devices will not store broadcast-format objects but will first convert them into the storage format. Objects are advantageously handled as constant-size data parts, or frames, so that the difference between the broadcast format and storage format may be as small as a change of one bit or bit combination in the frame header part or other data structure describing the contents of the packet.

The scrambling method according to the invention further comprises a timing arrangement wherein the objects transmitted are time-stamped, ie. provided with data representing the transmission moment. Then, even if an object were stored in the broadcast format, its unauthorized reproduction at a later time can be prevented if the reproducing device first has to compare the stored time data to the real time. If the times are unidentical, reproduction is prohibited. The timing arrangement is based on an electrical memory medium which is advantageously a smart card or such. Below, this portable memory mediam will be called a smart card. In the arrangement according to a preferred embodiment of the invention the smart card includes a real time clock, which refers to any circuit in general which, when read at an arbitrary moment of time, unequivocally yields the data representing the time of the reading. According to the invention, each object is arranged both for transmission and storage into data parts that can be called frames, packets, cells or data groups and that are formatted according to existing standards and recommendations describing data transmission and/or storage. At least part of the frames and data groups are provided with a time stamp which in the case of broadcasting refers to the time of transmission and in the case of storage to the time of storing.

The contents of an object to be transmitted or distributed as an original recording (such as a CD) are scrambled using a known method where descrambling requires a certain cipher key which advantageously is a relatively big binary number. A user may purchase the right to use the object in question so that when he pays a certain sum of money, the necessary key or keys will be loaded into his smart card. A key may be valid for a fixed or an indefinite period of time. In the case of a transmitted object the user pays a different sum according to whether he uses the object just once (real time use) or stores (copies) it to be used later and possibly several times. 'Using' here means broadly viewing, listening to or otherwise exploiting the object. Because of the different prices for the real time use and storage the keys stored in the smart card have to be different for the different purposes of use.

BRIEF DESCRIPTION OF THE DRAWINGS

The invention is described in more detail with reference to the preferred embodiments presented by way of example and to the attached drawing, in which.

Like elements in the drawing are depicted by like reference designators.

Figure 1:
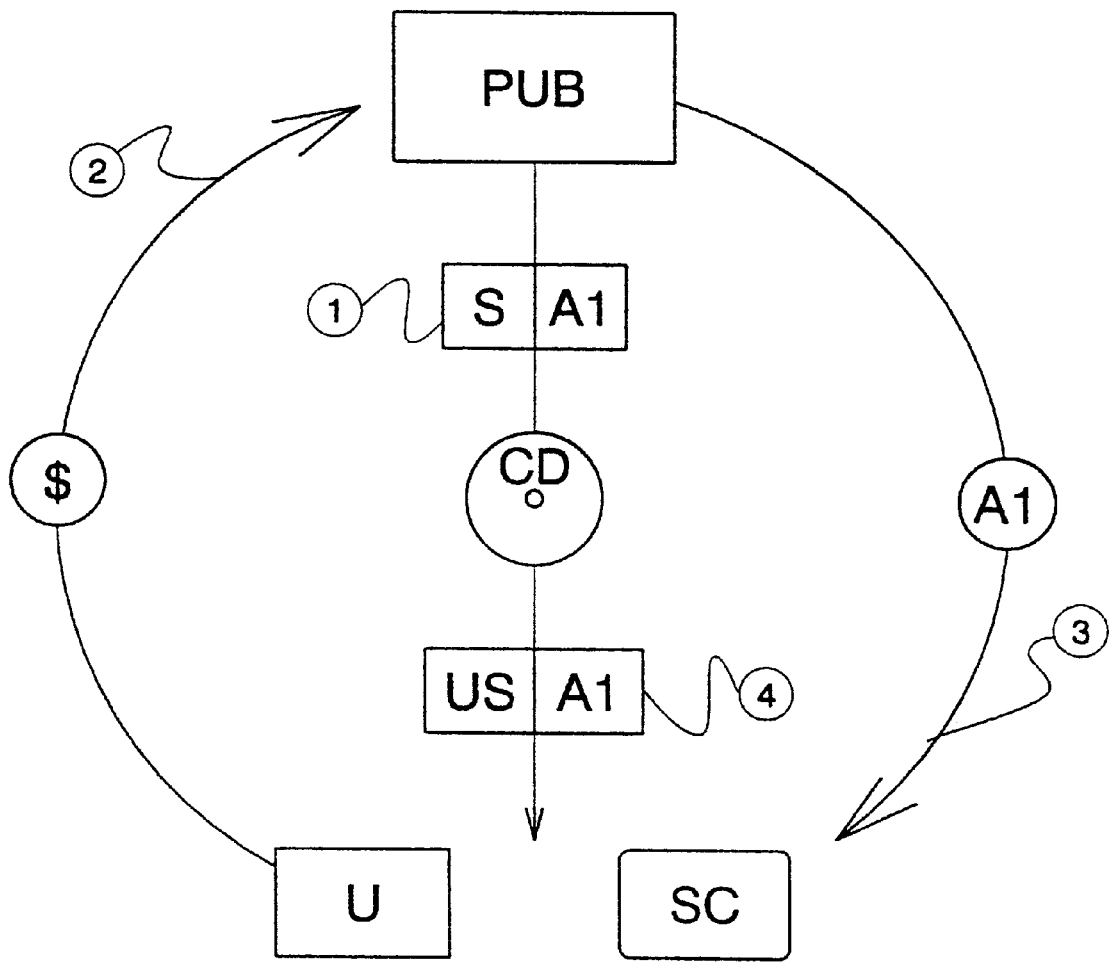
FIG. 1 shows one phase in the application of the method according to the invention.
Figure 2:
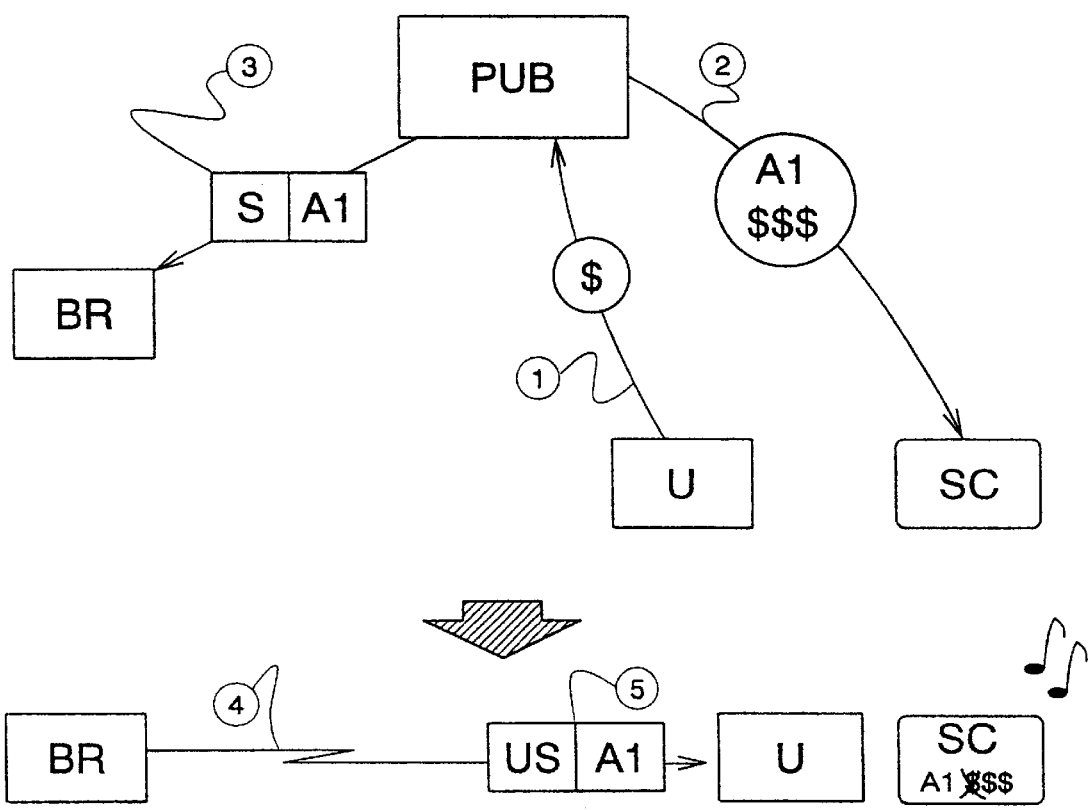
FIG. 2 shows as a series of pictures other phases in the application of the method according to the invention.

Since the invention provides for the broadcasting of digital objects, it will be first described the essential features of the digital audio broadcasting (DAB) system used here as an illustrative application. In the DAB system, the information in an audio transmission and in a data tranmission in general is transported in constant-size data parts that in the case of an audio transmission are called audio frames and in the case of a data transmission data groups. Each audio frame and data group includes a header part containing records or fields describing its contents, and a payload part that contains the actual data to be transmitted. In addition, the DAB system specifies in the way known to one skilled in the art data structures that are used for transferring both frame-specific and more general control information from the transmitting to the receiving device. The most important forms of such data structures are the fast information groups (FIG) transferred on the so-called fast information channel (FIC) and, in the case of audio frames, the frame-specific program associated data (PAD) fields.

The DAB system specifies the following audio frame specific data and their transmission along with a scrambled audio broadcast:

1a) scrambling of frame with a known or encrypted key

In the DAB system, scrambling and encrypting mean different things. Scrambling means changing the audio data such that the sound contained in it cannot be reproduced without knowing a certain key. Said key is a number which, when fed as a seed to a certain generator producing pseudo-random numbers, produces a pseudo-random bit sequence corresponding to the key in question. A logical XOR (exclusive-OR) operation executed between the bit sequence and the scrambled audio data produces reproducable audio data. This operation opposite to scrambling is called descrambling. The key, which is given to the user, may be clear (known) or encrypted; in the latter case, the encrypted key must first be decrypted. There exist several arrangements to implement the encryption of the key and we will return to them later on. This paragraph refers to the fact that the audio frame specific data in the DAB system indicate whether the frame in question is scrambled using a known or an encrypted key.

1b) conditional access system used

The encryption procedure as a wider concept is included in the conditional access system which includes several specifications related to the access rights of services. Known conditional access systems include Eurocrypt and NR-MSK, among others. The conditional access system applied can be indicated for each frame.

1c) cryptoalgorithm

Code for a certain algorithm identifying the calculatory method applied in the key encryption procedure.

1d) time stamp

A time stamp referring to the date and/or time of day can be included in the frames so that it corresponds to the time of transmission. 1e) authorization data Frames can include identification information which identifies the object transmitted and e.g. the party that produced the object and is the holder of the copyright of the object.

1f) encrypted key 1g) initialization modifiers

Typically, a scrambling key is valid for a few frames only. Furthermore, a so-called initialization, or reset, can be performed between those frames, too, resetting the pseudo-random bit sequence generator used in the descrambling so that possible errors in the long bit sequence be less harmful. The initialization modifiers define how the generator will be initialized.

1h) scrambled audio frame to be transmitted

In addition, the DAB system specifies the following data group specific information and its transmission along with a scrambled data transmission:

2a) scrambling of frame with a known or encrypted key
Same as 1a.

2b) conditional access system used
Same as 1b.

2c) cryptoalgorithm
Same as 1c.

2d) time stamp
Same as 1d.

2e) authorization data
Same as 1e.

2f) encrypted key 2g) initialization modifiers
Same as 1g.

2h) scrambled data group to be transmitted

In addition, the DAB recommendations specify file-specific transmission as regards the following information:

2i) file name or id number 2j) number of data groups (blocks, segments) in the file 2k) file size in bytes 2l) file version number for modified files.

Next, we will have a look at the frame specific data that according to the invention will be attached to audio frames to be stored. The number, order and size of the records presented as well as the bit value and bit combination definitions are given by way of example only and are not intended to limit the invention.

3a) audio frame count, 24 bits

Stored frames related to a particular object are consecutively numbered. The proposed 24-bit numbering field can be used to identify $2^{24}$ frames. If each frame corresponds, according to the DAB standard, to a 24-millisecond playback period, the maximum duration of the stored object is about 4½ days. The consecutive numbering of frames is advantageous especially in operations such as fast rewind, fast forward and search.

3b) original/copy, 1 bit

One so-called flag bit indicates whether the object is an original version or a copy. For example, flag bit value 1 refers to an original and 0 to a copy. A storing (copying) device has to be built such that it sets the frame-specific flag bit to 0.

3c) storage attributes, 2 bits

With two bits it is possible to indicate what kind of use is allowed for the object in question. The tables below show an advantageous specification of bit combinations.

TABLE 1 scrambled audio object

| bit b1 | bit b0 | meaning |
|---|---|---|
| 0 | 0 | original object and copy can be stored unscrambled |
| 0 | 1 | original object and copy can be stored scrambled |
| 1 | 0 | original object can be stored unscrambled but copy cannot be stored |
| 1 | 1 | original object can be stored scrambled but copy cannot be stored |

TABLE 2 unscrambled audio object

| bit b1 | bit b0 | meaning |
|---|---|---|
| 0 | 0 or 1 | original object and copy can be stored unscrambled |
| 1 | 0 or 1 | original object can be stored unscrambled but copy cannot be stored |

3d) frame scrambled bit, 1 bit

One flag bit indicates whether the frame in question is scrambled or not. Inside a scrambled object there may be unscrambled frames, so it is advantageous to have a frame-specific scrambling indication.

3e) frame scrambled with a known or encrypted key, 1 bit

Same as 1a. Flag bit value 1 corresponds to a clear key and value 0 to an encrypted key.

3f) conditional access system used, 3 bits

Same as 1b. With three bits it is possible to identify 8 different conditional access systems at the most.

3g) cryptoalgorithm, 6 bits

Same as 1c. With six bits it is possible to identify 64 different cryptoalgorithms at the most.

3h) storage information, 21 bits

This field is divided into two subfields:

storage medium identifier, 4 bits, e.g. as in the table below (rest of the bit combinations are reserved for future expansion)

| b3 | | | b0 | medium |
|---|---|---|---|---|
| 0 | 0 | 0 | 0 | broadcast |
| 0 | 0 | 0 | 1 | tape |
| 0 | 0 | 1 | 0 | CD |
| 0 | 0 | 1 | 1 | hard disk |
| 0 | 1 | 0 | 0 | remote storage, e.g. in local area network | date, 8+4+5 bits, including the last two digits of the year (0 to 9, both coded with 4 bits), the ordinal number of the month (1 to 12 coded with 4 bits) and the day of the month (1 to 31 coded with 5 bits) and corresponding in the case of local storage to the storage date and in the case of broadcast or network storage the current date.

3i) authorization data, 261 bits

Since the total number of bits presented so far is not divisible evenly by 8 and since it is advantageous to begin certain byte specific data from the byte boundary, this field advantageously starts with 5 padding bits which are all ones. They are followed by a 32-byte (256-bit) authorization data field which can contain information depending on the conditional access system used, such as the service provider identification code, program identification code and program classification.

3j) encrypted or unencrypted key, 168 bits

This field is divided into three subfields that are as follows:
  number of remaining frames with a key (8 bits), which indicates for how long the current key will be used for descrambling,
  current key (80 bits), and
  next key (80 bits).

The two-key arrangement gives to the receiving or reproducing device time to decrypt the next encrypted key. When the count of remaining frames reaches zero, the new key becomes the current key and the next key becomes the new key. The real length of the key depends on the scrambling system used and on the encryption method of the key, so the 80 bits mentioned here is just the maximum length.

3k) initialization modifiers, 40 bits

Same as 1g.

3l) standard for the audio frame structure, 8 bits

Since, according to the invention, the storage format is not tied to any particular audio frame structure, it is advantageous to indicate in the stored frame data the standard with which the frame complies. The frame may be e.g. an ISO/IEC 11172-3 Layer II or Layer III frame in accordance with the motion picture experts group (MPEG) standards or a DAB audio frame. When coding the standard identifier with eight bits, ample space is left in reserve for future frame standards.

3m) hash sum for 3a to 3l, 88 bits

The fields described above in 3a to 3l are advantageously left unscrambled so that they can be read as quickly as possible in connection with reception and/or playback. However, they have to be somehow protected against unauthorized modification. According to the invention, a so-called hash algorithm is used in a known manner, said algorithm being identified by the 8 first bits in the 3m field and used to calculate a certain 80-bit result on the basis of the bit contents of said fields. By comparing the contents of fields 3a through 3l to the hash sum it is possible to detect whether the contents of the fields have been changed after the hash sum was calculated. Since an unauthorized device does not know the hash algorithm, it cannot change the hash sum to correspond to the modified header field values.

3n) stored scrambled or unscrambled audio frame, variable length

In the beginning of the frame there is a 16-bit length subfield indicating the length of the audio frame in bytes. The length of the frame depends on the encoding method, level of compression and possible ancillary data (program associated data, PAD, in the DAB). Inclusion of the length information in the beginning of the frame helps operations such as fast rewind, fast forward and search.

Next, we will have a look at the data group specific information attached according to the invention to the data groups stored. From the point of view of the invention it is not essential how the file specific information (2i to 2l) is stored since according to the invention the scrambling and protection arrangements are performed on the data group level. The number, order and size of the records presented and the bit value and bit combination specifications are presented by way of exanple only and are not intended to limit the invention.

4a) data group numbering, 24 bits

Data groups related to a particular file are consecutively numbered. In this sense, the data groups can be called blocks or segments. The consecutive numbering is advantageous especially in operations such fast rewind, fast forward and search.

4b) original/copy, 1 bit

Same as 3b.

4c) storage attributes, 2 bits

Same as 3c.

4d) data group scrambled bit, 1 bit

Same as 3d.

4e) data group scrambled with a known or an encrypted key, 1 bit

Same as 3e.

4f) conditional access system used, 3 bits

Same as 3f.

4g) cryptoalgorithm, 6 bits

Same as 3g.

4h) storage information, 21 bits

Same as 3h.

4i) authorization data, 261 bits

Same as 3i.

4j) encrypted or unencrypted key, 168 bits

Same as 3j.

4k) initialization modifiers, 40 bits

Same as 3k.

4l) hash sum for 4a to 4k, 88 bits

Same as 3m.

4m) stored scrambled or unscrambled data group, variable length

Same as 3n.

Let us next consider the real time clock in the smart card as part of the implementation of the arrangement according to the invention. There are good reasons to include the real time clock in the system because then it becomes possible to distinguish between the immediate reproduction of a received broadcast object and a later reproduction of an object stored (illegally) in the broadcast format. As was mentioned earlier, devices that store digital objects should be designed and built such that they cannot store objects in the broadcast format but in connection with the storing change certain bits in the storage information field (3h/4h above) so that they indicate the storage medium. However, it is possible to build a "pirate" device that does not change the bits in question but simply stores the object in the broadcast format. But as the pirate device does not know the calculation algorithm for the hash sum (3m/4l above) it cannot change the frame or data group time stamp and calculate a corresponding new hash sum. Since it is required of reproduction devices that they compare the time stamps in the frames or data groups of broadcast-format objects to their own real time clocks before allowing reproduction, a recording made by a pirate device can be reproduced only using a similar pirate device where the time stamp comparison to the real time clock is bypassed. It is, however, probable that all legally sold reproduction devices include said comparison feature, so the arrangement can at least to a large extent prevent the sales of pirate copies stored in the broadcast format to those users who own a legal device.

Said real time clock is advantageously located in the smart card because then its unauthorized changing can be prevented in the same known way as the changing of other information in the smart card. Furthermore, it can be required that when a user presents his smart card to an authorized dealer for new keys to be loaded in it in the manner described later on, the new keys will not be loaded if the clock in the smart card has been tampered with. If the time stamps are made, as proposed above, at the accuracy of one day, there follows that, first, the real time clock need not be readable at a greater accuracy than that and, second, objects stored in the broadcast format can be freely used during that one day. If a stricter time control is to be applied, then more bits will have to be reserved in the frames and data groups for the time stamp.

For continuous operation of the real time clock the smart card has to be provided with a power supply, which is advantageously a small rechargeable battery that can be charged always when the smart card is connected to a receiver and/or playback device. When the battery voltage drops below a certain threshold value, the real time clock is advantageously set in a shut-down state where its operation is prohibited, and it can be made operational again only by an authorized dealer at an authorized shop or through a secure two-way telecommunications link. The secret information needed for the removal of the shut-down state is advantageously stored in the permanent memory of the smart card when the card is delivered to the user. A similar operation by an authorized dealer is required if the real time clock in the smart card has to be set to a new time, e.g. when crossing time zones, if the system does not use a certain standard time (such as the Greenwich Mean Time, GMT) in all its operations.

A device for an ordinary user which receives and/or reproduces digital objects can read and display to the user the time shown by the real time clock in the smart card but it cannot change it without authorization from an authorized dealer.

Referring to FIGS. 1 to 4, it will be now described the selling and transferring of various rights and corresponding keys in the system according to the invention enabling payments to the parties who own the rights related to the objects and/or their broadcasting. In the embodiments depicted by way of example the parties are the publisher (PUB; also content provider), broadcaster (BR; also service provider) and the user (U) of the object. The encircled numbers in the drawing represent one possible mutual order of the various steps, without limiting the invention, though.

In the case depicted by FIG. 1, a user U buys from a representative of a publisher PUB a record CD which contains the desired object. The publisher has manufactured the record in such a way that the data is in scrambled form (S) and the keys needed for descrambling, which are included in the frames of the record (3j and 4j above), are encrypted. The price of the record corresponds to the manufacturing and transportation costs and does not include the charge for the right of use of the contents of the record. The key needed for decrypting the encrypted keys is called an authorization and is marked A1. By paying the appropriate sum $ the user gets the authorization.

The events in FIG. 1, in the order of their occurrence, are as follows:

① A publisher PUB produces a record CD in scrambled form (S) and attaches to it the encrypted keys. An authorization A1 is needed for decrypting the keys.

② A user U pays to the publisher PUB both the price of the record CD and the charge $ for the right of use of the contents of the record.

③ The publisher PUB gives to the user U the authorization A1 needed for the decrypting by storing it in the uses smart card SC.

④ The user inserts the smart card SC and the record CD in a playback device (not shown) which then uses the authorization A1 to decrypt the keys and descrambles (US) the stored object while reproducing the object to the user.

The authorization A1 may be different and have different prices according to whether it entitles the user U only to use the stored object or also to copy it. The authorization may be publisher-specific, covering all products of a particular publisher, in which case the identification information related to the object in question has to be stored in the smart card SC in addition to the authorization. If the user later buys another product from the same publisher, the authorization need not be loaded again in the smart card but only the identification information of the new product In the case depicted by FIG. 2, a user U acquires from a publisher PUB the right to use objects produced by said publisher and transmitted by a broadcaster BR. The idea is that a publisher-specific authorization A1 and a certain amount of money are loaded in the user's smart card SC against a certain payment $. The publisher PUB transfers an object to the broadcaster BR so that the object is already scrambled (S) and its scrambling keys are encrypted and require an authorization A1. The broadcaster broadcasts the object in question, which is then received and descrambled (US) by a device of the user U using the authorization A1. The events in FIG. 2, in the order of their occurrence, are as follows:

① A user U pays to a publisher PUB a publisher-specific license fee $.

② The publisher PUB gives an authorization A1 needed in the decrypting to the user U by storing it in the users smart card SC. At the same time, a certain amount of "electronic money" $$$ is loaded in the smart card.

③ The publisher transfers a scrambled (S) object to a broadcaster BR and attaches to it the encrypted keys. An authorization A1 is needed to decrypt the keys.

④ The broadcaster BR broadcasts the object.

⑤ The user inserts the smart card SC in a receiver and playback device (not shown) which then uses the authorization A1 to decrypt the keys and descrambles (US) the received object while reproducing the object to the user. At the same time, certain amount of electronic money in the smart card SC is marked spent.

Electronic money loaded in the smart card is marked spent in proportion as the user receives and uses broadcast objects. The amount marked spent advantageously depends on whether the user just reproduces the received object or stores it for later use. The identification information needed for identifying a certain object and the prices corresponding to the different purposes of use are broadcasted along with the object.

Figure 3:
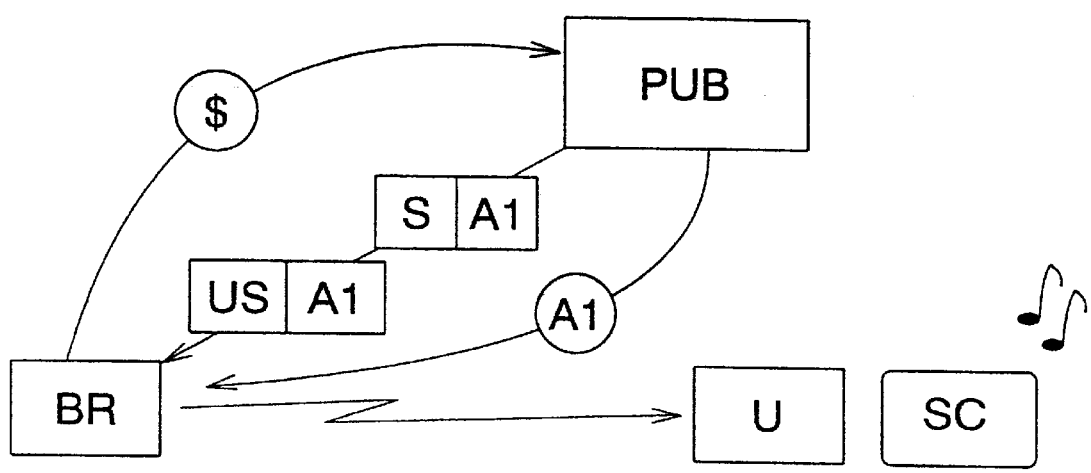
FIG. 3 shows an alternative way of applying the method according to the invention.

FIG. 3. depicts a situation where a broadcaster BR purchases objects from a publisher PUB and distributes them free of charge to users U. The situation is otherwise the same as in FIG. 2, but the payments are made between the publisher PUB and the broadcaster BR, and the broadcaster BR gets the authorization A1 needed for the decryption. The broadcaster descrambles (US) the object and broadcasts it either entirely unscrambled or scrambled with unencypted keys which the receiving device can read direct from the broadcast (cf. 3e and 4e above). Then, no money is marked spent in the user's smart card and, indeed, the user has no need for any authorization for which he should pay.

The concept of electronic money in connection with smart cards is known as such. A smart card may contain either "common money", meaning that an amount of money loaded in the smart card can be used for paying any charges to anyone, or money marked for a certain purpose. In the system according to the invention this means especially that common money could be used for paying for objects from any publisher, whereas money marked for a certain purpose, ie. for a single publisher, could only be used for paying for objects coming from that particular publisher. The latter arrangement is the better since the publisher gets the money already in connection with the loading of the authorization, and there will be no confusion about what has been paid, to whom and for what services.

The embodiment of the invention described above, referring to FIG. 2, has the disadvantage that if a user has not acquired a publisher-specific authorization A1, he cannot use any objects from that particular publisher PUB broadcasted scrambled by a broadcaster BR. This disadvantage can be eliminated by an alternative embodiment according to FIG. 4 wherein a user U pays $ for a broadcaster-specific authorization A2 and loads in his smart card electronic money marked for that broadcaster BR. A publisher PUB transfers an object to the broadcaster BR so that the object is scrambled (S) and its scrambling keys are encrypted and require an authorization A1. The broadcaster BR decrypts the keys and descrambles (US) the object but then scrambles (S) the object again so that the new scrambling keys are encrypted and require an authorization A2. The broadcaster broadcasts the object which is then received and descrambled (US) by a device of the user U using the authorization A2.

If the agreement between the broadcaster BR and the publisher PUB requires that the publisher get paid according to how much the users have used the publisher's objects, the user's smart card SC divides the broadcaster-specific amount of money into publisher accounts and charges the accounts according to the use (direct use, storing, copying) of the objects. Later the user takes his smart card to be read by the broadcaster, publisher or an authorized dealer, where the accounts are read and the broadcaster then has to pay the corresponding sums to the publishers. The smart card can also be read at the user's home through a secure two-way communications link. To motivate the user to have his card read, the authorizations can be arranged so that the user cannot later use a stored object before the respective accounts in the smart card have been settled.

Figure 4:
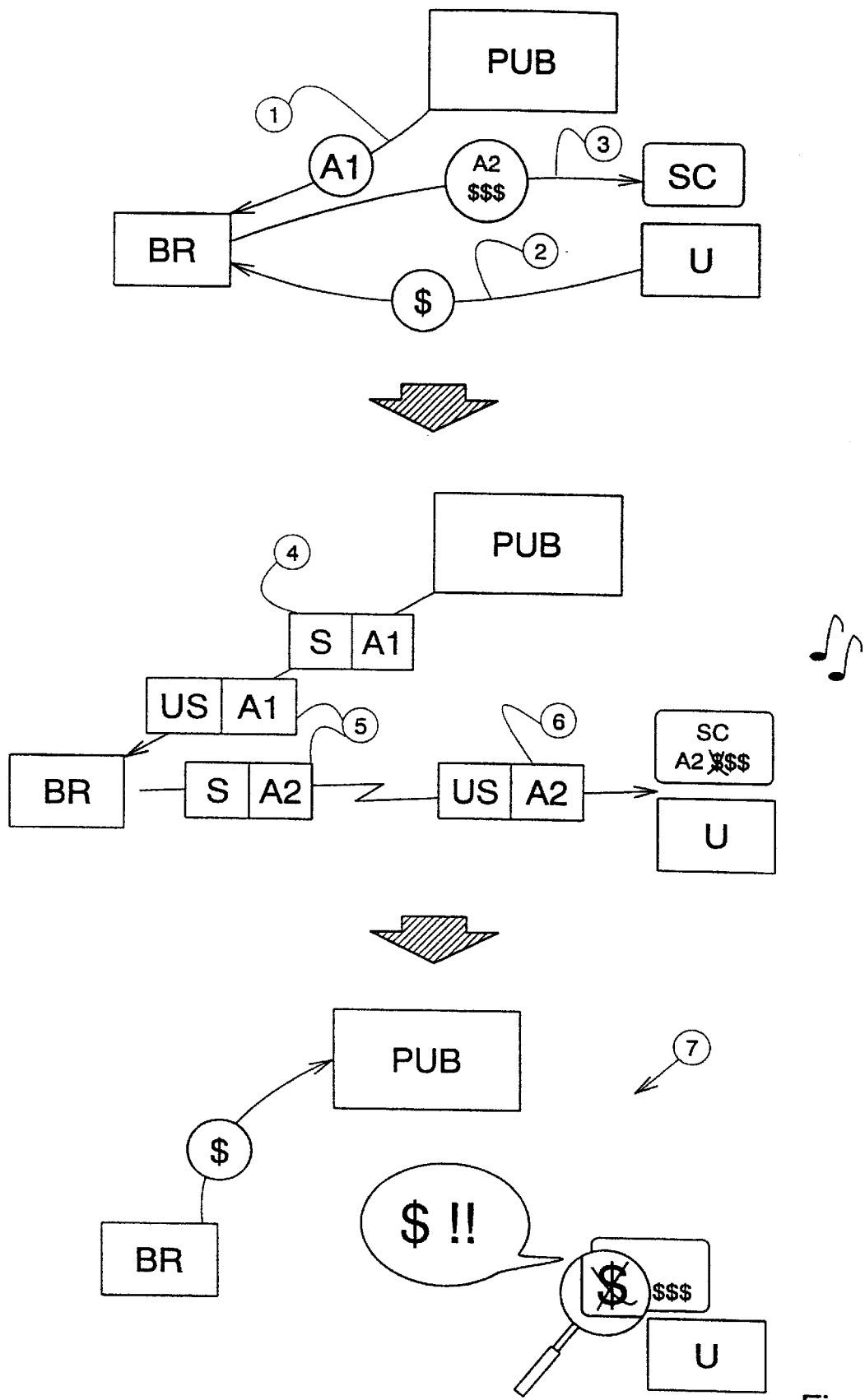
FIG. 4 shows another alternative way of applying the method according to the invention.

The events if FIG. 4, in the order of their occurrence, are as follows:

① A publisher PUB and a broadcaster BR agree on broadcasting and the publisher PUB gives to the broadcaster BR an authorization A1 needed for decryption ② A user U pays to the broadcaster BR a broadcaster-specific license fee $.

③ The broadcaster gives to the user U an authorization A2 needed for decryption by storing it in the user's smart card SC. At the same time, a certain amount of "electronic money" is loaded in the smart card.

④ The publisher PUB delivers an object in a scrambled form (S) to the broadcaster and attaches to it the encrypted keys. An authorization A1 is needed to decrypt the keys.

⑤ The broadcaster BR uses authorization A1 to decrypt the scrambling keys and descrambles (US) the received object but then scrambles (S) it again so that authorization A2 is needed for the decryption. The broadcaster then broadcasts the object.

⑥ The user inserts the smart card SC in a receiver and playback device (not shown) which then uses authorization A2 to decrypt the scrambling keys and descrambles (US) the received object while reproducing the object to the user. At the same time, certain amount of electronic money in the smart card SC is marked spent.

⑦ If required by the agreement between the publisher and the broadcaster, the user has his smart card SC read, and the broadcaster BR pays license fees to the pushlisher PUB on the basis of the data in the smart card.

All above-mentioned authorizations loaded in the user's smart card can be valid for a fixed period of time or until further notice. The real time clock in the smart card is useful in the implementation of the fixed-period feature because then the receiver and playback devices need not have a clock. It is also more difficult to tamper with a clock in the smart card than with a clock in a certain device.

If the reception and use of an object are recorded in the smart card, it can be so arranged that by presenting his smart card to an authorized dealer the user is able to show that he has already paid for the use of the object and can then have the original record for a small extra charge as in FIG. 1.

The invention requires no changes in known object broadcasting media since the scrambling of digital objects in broadcasting is known in the prior art. A terminal equipment according to the invention has to include means for receiving and descrambling a transmission scrambled using a known method and for decrypting the scrambling keys by means of an authorization stored on a memory medium. In addition, a storing terminal equipment has to include means for producing the storage format described above in the storing phase, and for reading it in the playback phase. These means are advantageously realized as software processes executed by a microprocessor controlling the operation of the terminal equipment or another programmable device operating under its control, such processes being routinely drawn up by those skilled in the art.

What is claimed is:

1. A method for handling a digital media object arranged to be protected against unauthorized use, wherein the digital media object is electrically distributable to several receivers and storable on a memory medium for later use and a scrambled broadcast format is defined for electrically distributing the digital media object, the scrambled broadcast format necessitating both knowledge about the appropriate descrambling algorithm and the possession of at least one descrambling key to enable it to be descrambled, the method comprising the steps of:

converting the digital media object into a scrambled storage format, which is different from said scrambled broadcast format and necessitates both knowledge about the appropriate descrambling algorithm and the possession of at least one descrambling key to enable it to be descrambled;

storing said digital media object in said scrambled storage format on a memory medium; and determining, when the digital media object is reproduced to a user, if the difference between a timestamp included in the scrambled broadcast format and a timestamp of reproduction exceeds a predetermined maximum and preventing the digital media object from being reproduced if the difference exceeds the predetermined maximum.

2. The method of claim 1, wherein in said scrambled storage format the digital media object is divided into frames which have a predetermined structure and contain actual data to be stored and other information related to the storage.

3. The method of claim 2, wherein to distinguish from said scrambled broadcast format said other information in the frames includes a piece of information saying that the format is a scrambled storage format.

4. The method of claim 2, wherein at least part of said other information in the frames is protected by including in the scrambled storage format a data part the contents of which is determined on the basis of the information to be protected in a manner determined by a secret algorithm.

5. The method of claim 1, wherein a digital media object in the scrambled broadcast format includes a time stamp that refers to the time of broadcasting and a digital media object in said scrambled storage format includes a time stamp that refers to the time of storing.

6. The method of claim 5, further comprising the steps of a) examining, when the digital media object is reproduced to a user, whether the digital media object in question is in the scrambled broadcast format, wherein a positive result corresponds to the digital media object being in the scrambled broadcast format and a negative result corresponds to the digital media object not being in the scrambled broadcast format, and b) as a response to a negative result in step a), not comparing the time stamp included in the scrambled broadcast format to the time of reproduction.

7. The method of claim 1, further comprising the step of delivering the entitlement to use and/or store a particular digital media object to a user in the form of a key stored on a portable memory medium.

8. The method of claim 7, wherein when a digital media object is reproduced to a user the time of reproduction is read from a clock included in said portable memory medium.

9. Terminal equipment for receiving, storing and reproducing to a user digital media objects, comprising:

means for descrambling a digital media object in a scrambled broadcast format necessitating both knowledge about the appropriate descrambling algorithm and the possession of at least one descrambling key to enable it to be descrambled;

means for storing a received digital media object in a scrambled storage format which is different from said scrambled broadcast format; and determining, when the digital media object is reproduced to a user, it the difference between a timestamp included in the scrambled broadcast format and a timestamp of reproduction exceeds a predetermined maximum and preventing the digital media object from being reproduced if the difference exceeds the predetermined maximum.

10. The terminal equipment of claim 9, further comprising means for decoding a time stamp included in a digital media object in the broadcast format in connection with the reproduction of the media object and for comparing said time stamp to the time of reproduction.

11. The terminal equipment of claim 10, comprising means for reading the time of reproduction from a portable memory medium.

12. A method for handling a digital media object arranged to be protected against unauthorized use, wherein the digital media object is electrically distributable to several receivers and storable on a memory medium for later use and a scrambled broadcast format is defined for electrically distributing the digital media object, the method comprising the steps of:

converting the digital media object into a scrambled storage format, which is different from said scrambled broadcast format, wherein the digital media object in the scrambled broadcast format includes a time stamp that refers to the time of broadcasting, and wherein the digital media object in said scrambled storage format includes a time stamp that refers to the time of storing; and storing said digital media object in said scrambled storage format on a memory medium.

13. The method of claim 12, wherein in said scrambled storage format the digital object is divided into frames which have a predetermined structure and contain actual data to be stored and other information related to the storage.

14. The method of claim 13, wherein to distinguish from said scrambled broadcast format said other information in the frames includes a piece of information saying that the format is a scrambled storage format.

15. The method of claim 13, wherein at least part of said other information in the frames is protected by including in the scrambled storage format a data part the contents of which is determined on the basis of the information to be protected in a manner determined by a secret algorithm.

16. The method of claim 12, wherein a digital media object in the scrambled broadcast format includes a time stamp that refers to the time of broadcasting and a digital media object in said scrambled storage format includes a time stamp that refers to the time of storing.

17. The method of claim 12, further comprising the step of delivering the entitlement to use and/or store a particular digital media object to a user in the form of a key stored on a portable memory medium.

18. The method of claim 17, wherein when a digital media object is reproduced to a user the time of reproduction is read from a clock included in said portable memory medium.

19. Terminal equipment for receiving, storing and reproducing to a user digital media objects, comprising:

means for descrambling a digital media object in a scrambled broadcast format;

means for storing a received digital media object in a scrambled storage format which is different from said scrambled broadcast format; and means for decoding a time stamp included in the digital media object in the broadcast format in connection with the reproduction of the media object for comparing said time stamp to the time of reproduction.

20. The terminal equipment of claim 19, comprising means for reading the time of reproduction from a portable memory medium.

* * * * *